United States Patent
Akashi et al.

(10) Patent No.: US 10,807,495 B2
(45) Date of Patent: Oct. 20, 2020

(54) ELECTRICITY STORAGE CONTROL DEVICE

(71) Applicant: KABUSHIKI KAISHA TOSHIBA, Minato-ku, Tokyo (JP)

(72) Inventors: Masakuni Akashi, Shinjuku Tokyo (JP); Masaaki Saito, Itabashi Tokyo (JP); Masahiko Murai, Hachioji Tokyo (JP); Yumi Hanashima, Yokohama Kanagawa (JP); Hiroyuki Kaneko, Higashimurayama Tokyo (JP); Miyako Miyoshi, Ichikawa Chiba (JP)

(73) Assignee: KABUSHIKI KAISHA TOSHIBA, Tokyo (JP)

( * ) Notice: Subject to any disclaimer, the term of this patent is extended or adjusted under 35 U.S.C. 154(b) by 652 days.

(21) Appl. No.: 15/508,454

(22) PCT Filed: Jun. 10, 2015

(86) PCT No.: PCT/JP2015/066780
§ 371 (c)(1),
(2) Date: Mar. 2, 2017

(87) PCT Pub. No.: WO2016/035408
PCT Pub. Date: Mar. 10, 2016

(65) Prior Publication Data
US 2017/0267118 A1    Sep. 21, 2017

(30) Foreign Application Priority Data
Sep. 3, 2014    (JP) .................................. 2014-179439

(51) Int. Cl.
| B60M 3/06 | (2006.01) |
| B60L 58/12 | (2019.01) |
| H02J 3/32 | (2006.01) |
| H02J 7/00 | (2006.01) |
| B60L 11/18 | (2006.01) |
| H02J 7/14 | (2006.01) |
| H02J 7/16 | (2006.01) |

(52) U.S. Cl.
CPC ........... *B60L 58/12* (2019.02); *B60L 11/1861* (2013.01); *B60M 3/06* (2013.01); *H02J 3/32* (2013.01);
(Continued)

(58) Field of Classification Search
CPC ....................................................... B60L 58/12
See application file for complete search history.

(56) References Cited

U.S. PATENT DOCUMENTS

| 6,431,323 | B2 | 8/2002 | Tajima et al. |
| 9,312,717 | B2 | 4/2016 | Nogi et al. |

(Continued)

FOREIGN PATENT DOCUMENTS

| CN | 1301662 A | 7/2001 |
| EP | 1538020 A2 | 6/2005 |

(Continued)

OTHER PUBLICATIONS

Extended European Search Report (EESR) dated Mar. 21, 2018 issued in counterpart European Application No. 15838852.0.
(Continued)

*Primary Examiner* — John E Breene
*Assistant Examiner* — Jeffrey C Morgan
(74) *Attorney, Agent, or Firm* — Holtz, Holtz & Volek PC

(57) ABSTRACT

According to one embodiment, an electricity storage control device includes a setting unit, and a control unit. The setting unit sets, for each time zone, a target state of charge (SOC) of electric energy to be stored in an electricity storage device in the time zone. The control unit controls at least charging or discharging of the electricity storage device based on the set target SOC for each time zone, a SOC detected from the electricity storage device, and a voltage of a supply destination of electric power from the electricity storage device.

6 Claims, 9 Drawing Sheets

(52) U.S. Cl.
CPC ............... *H02J 7/00* (2013.01); *H02J 7/007* (2013.01); *H02J 7/0068* (2013.01); *H02J 7/1423* (2013.01); *H02J 7/16* (2013.01); *B60L 2200/26* (2013.01); *B60L 2240/54* (2013.01); *Y02T 10/7005* (2013.01)

(56) References Cited

U.S. PATENT DOCUMENTS

| | | | |
|---|---|---|---|
| 2001/0011618 A1 | 8/2001 | Tajima et al. | |
| 2014/0070770 A1 | 3/2014 | Nogi et al. | |
| 2014/0368154 A1* | 12/2014 | Hanashima | B60M 3/06 320/101 |

FOREIGN PATENT DOCUMENTS

| | | |
|---|---|---|
| EP | 2463981 A4 | 9/2017 |
| JP | 2001187676 A | 7/2001 |
| JP | 3244957 B2 | 1/2002 |
| JP | 2006034041 A | 2/2006 |
| JP | 2006062489 A | 3/2006 |
| JP | 2009067206 A | 4/2009 |
| JP | 2012166646 A | 9/2012 |
| JP | 2013095265 A | 5/2013 |
| WO | 2014049893 A1 | 4/2014 |

OTHER PUBLICATIONS

International Search Report (ISR) and Written Opinion dated Sep. 1, 2015 issued in Internatioanl Application No. PCT/JP2015/066780.

* cited by examiner

ELECTRICITY STORAGE CONTROL DEVICE

CROSS-REFERENCE TO RELATED APPLICATIONS

This application is national stage application of International Application No. PCT/JP2015/066780, filed Jun. 10, 2015, which designates the United States, incorporated herein by reference, and which claims the benefit of priority from Japanese Patent Application No. 2014-179439, filed Sep. 3, 2014, the entire contents of which are incorporated herein by reference.

FIELD

An embodiment described herein relates generally to an electricity storage control device.

BACKGROUND

Conventionally, efforts for energy saving have proceeded in railway business. For example, regenerative brake systems have been widely utilized that provide and use regenerative power generated by braking an electric train to and in another electric train through a feeder line. In the regenerative brake systems, the regenerative power generated in the electric train is supplied to another electric train when the other electric is in powering operation and present in the vicinity of the electric train to which the brake is applied whereas the regenerative power is not used and is wasted when no electric train in powering operation is present.

In recent years, electricity storage devices have progressively improved in performance and reduced in cost. Accordingly, alternative electricity storage systems have been proposed that store regenerative power in the electricity storage device when the regenerative power is not used and that use the stored power if necessary.

In railway passenger transportation, a power load largely varies depending on time zones, and thus reduction in power consumption at the peak time has been desired. The conventional technique however does not take into consideration the reduction in electric energy in the peak time zone and electricity storage control is performed in the same manner regardless of the peak time.

The present invention has been made in view of the above-mentioned circumstances and proposes an electricity storage control device that performs electricity storage control appropriate for each time zone.

DETAILED DESCRIPTION

In general, according to one embodiment, an electricity storage control device comprises a setting unit, and a control unit. The setting unit sets, for each time zone, a target state of charge (SOC) of electric energy to be stored in an electricity storage device in the time zone. The control unit controls at least charging or discharging of the electricity storage device based on the set target SOC for each time zone, a SOC detected from the electricity storage device, and a voltage of a supply destination of electric power from the electricity storage device.

Figure 1:
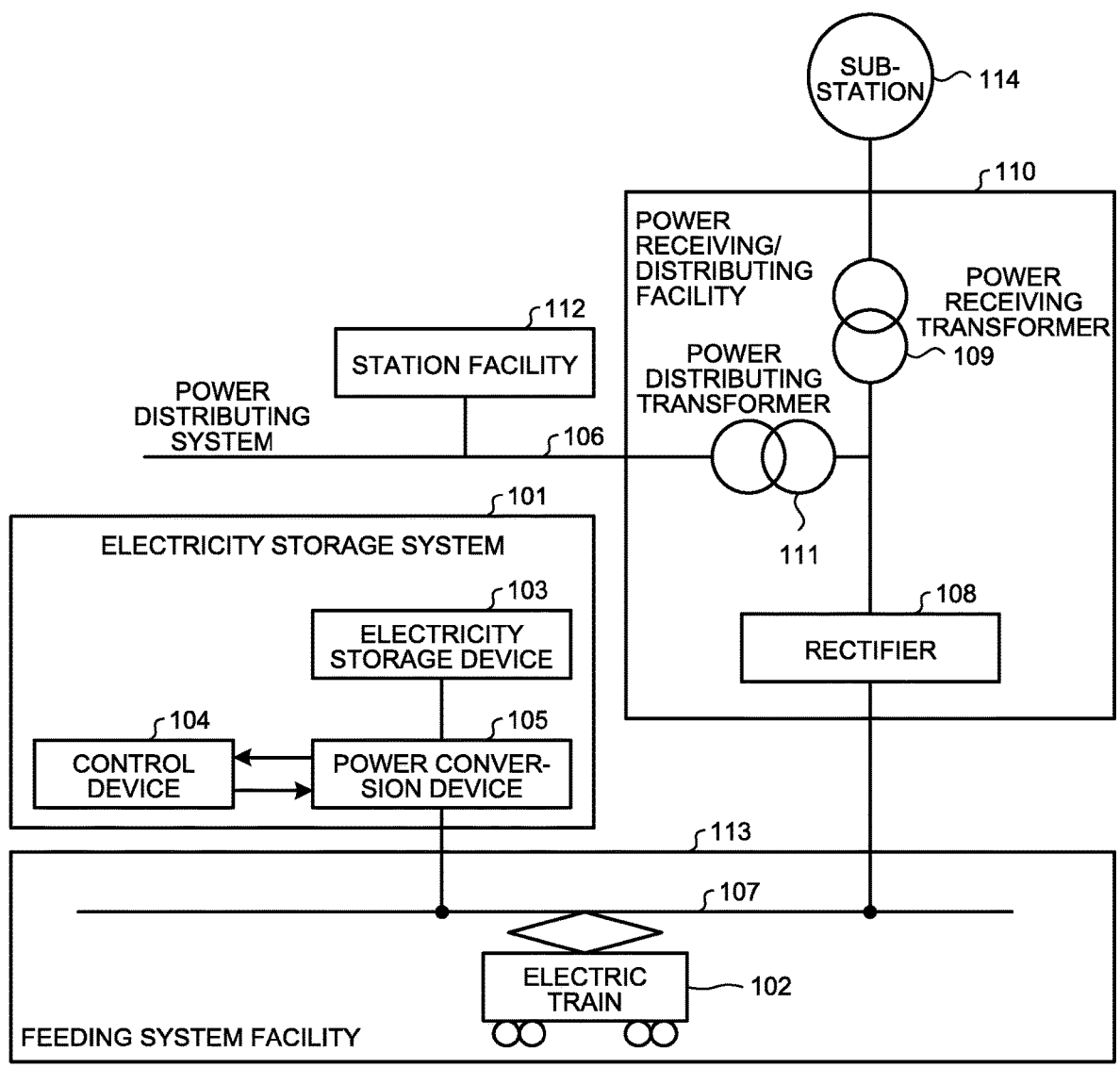
FIG. 1 is a diagram illustrating an example of the configuration of a railway system according to an embodiment.

FIG. 1 is a diagram illustrating an example of the configuration of a railway system according to an embodiment. As illustrated in FIG. 1, the railway system includes an electricity storage system 101, a power receiving/distributing facility 110, a feeding system facility 113, and a station facility 112.

The power receiving/distributing facility 110 includes a power receiving transformer 109, a power distributing transformer 111, and a rectifier 108, and supplies electric power supplied from a substation 114 to respective components of the railway system.

The power receiving transformer 109 receives alternating-current (AC) power from the substation 114. The power distributing transformer 111 steps down a part of the AC power received by the power receiving transformer 109, and supplies the electric power to the station facility 112 through a power distributing system 106. The rectifier 108 converts the AC power received by the power receiving transformer 109 into direct-current (DC) power, and supplies the electric power to an electric train 102 through a feeder line 107 (for example, an overhead line).

The power distributing system 106 is a system for supplying the electric power to the station facility 112 from the power receiving/distributing facility 110.

The station facility 112 is a facility including loads, such as escalators, illumination apparatuses, and OA apparatuses, and power supplies by solar power generation or the like in a station.

The feeding system facility 113 includes the feeder line 107 and the electric train 102. The electric train 102 performs powering operation with the electric power that is supplied through the feeder line 107 and supplies regenerative power generated by regeneration to another electric train and the electricity storage system 101 through the feeder line 107.

The electricity storage system 101 includes an electricity storage device 103, a power conversion device 105, and a control device 104, and is used for stably supplying electric power of the feeding system facility 113. In accordance with control by the control device 104, the electricity storage system 101 in the embodiment stores, in the electricity storage device 103, surplus regenerative power generated in the electric train 102 in the feeding system facility 113 and processes the electric power stored in the electricity storage device 103 for using it as electric power for powering operation of the electric train 102. With this configuration, the surplus regenerative power can be effectively utilized.

The power conversion device 105 receives the surplus regenerative power from the feeder line 107 and supplies electric power to the feeder line 107 for compensating a predetermined voltage thereof.

The control device 104 controls power transmission and reception of the power conversion device 105 based on a voltage of the feeder line 107 and a state of the power conversion device 105, and controls to charge and discharge the electricity storage device 103. In accordance with control by the control device 104, the electricity storage device 103 stores therein the surplus regenerative power that is supplied through the feeder line 107 and supplies the stored power to the feeder line 107.

Conventionally, when an electric train stops by applying the brake thereto, regenerative power that is generated by application of the brake is supplied to another electric train when the other electric train is in powering operation and present in the vicinity of the electric train. By contrast, when no electric train in powering operation is present, the electric train stops by applying the mechanical brake thereto because the regenerative power cannot be generated and therefore the regenerative brake cannot be used.

The railway system in the embodiment includes the electricity storage system 101 to enable the surplus regenerative power to be stored in the electricity storage device 103 through the power conversion device 105 even when no electric train in powering operation is present. The electric train 102 can therefore utilize the regenerative brake effectively even when no electric train in powering operation is present. Furthermore, the stored surplus regenerative power can be supplied to the feeding system facility 113 including the electric train 102 if necessary.

Figure 2:
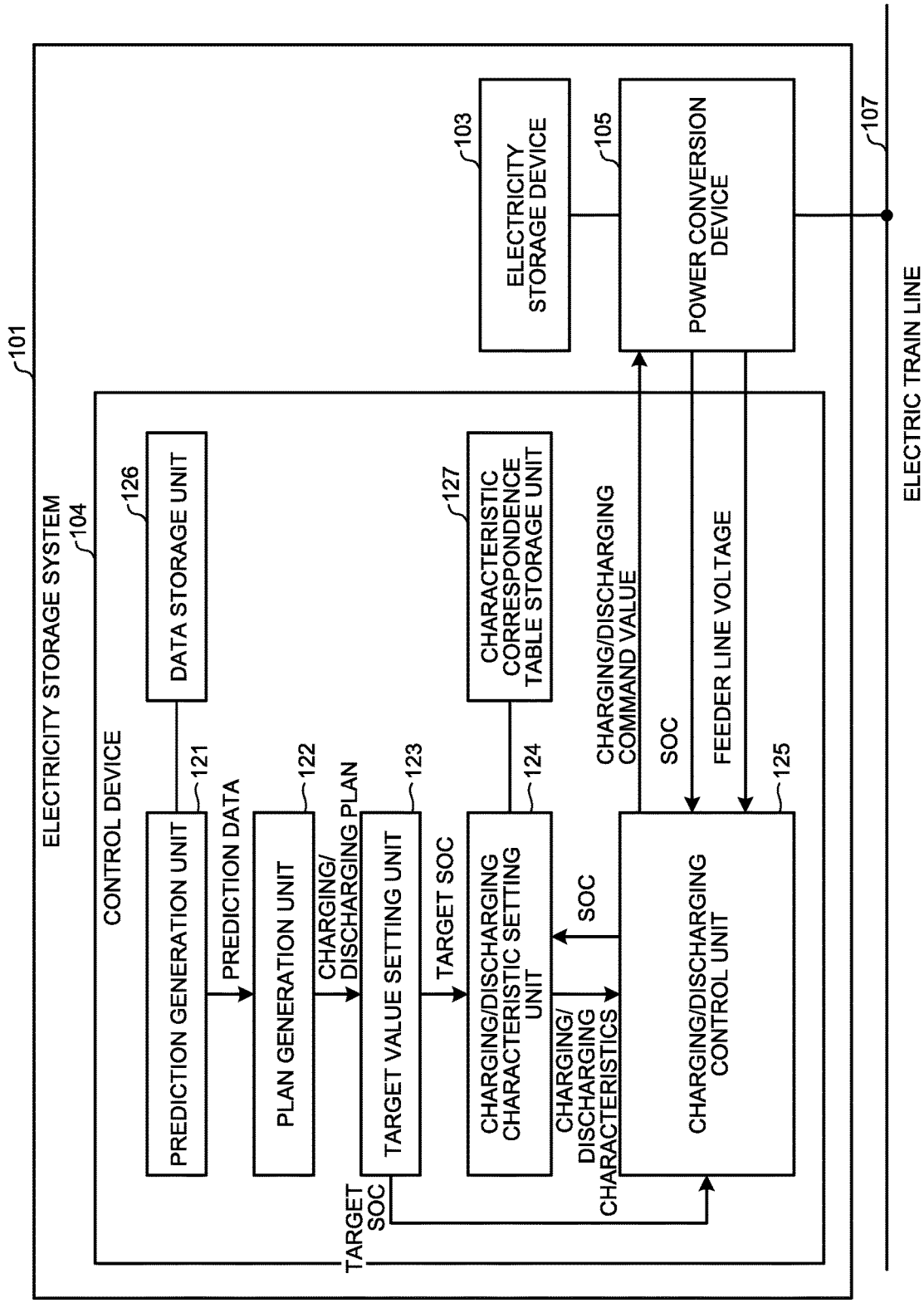
FIG. 2 is a diagram illustrating the configuration of an electricity storage system and data flow in the embodiment.

Next, the configuration of the electricity storage system 101 will be described. FIG. 2 is a diagram illustrating the configuration of the electricity storage system 101 and data flow in the embodiment. In an example illustrated in FIG. 2, the control device 104 outputs an instruction to the power conversion device 105 to control the power conversion device 105 and the electricity storage device 103. With this control, the electricity storage device 103 stores power and is discharged.

As illustrated in FIG. 2, the control device 104 includes a data storage unit 126, a prediction generation unit 121, a plan generation unit 122, a target value setting unit 123, a charging/discharging characteristic setting unit 124, and a charging/discharging control unit 125.

The data storage unit 126 stores therein, for each time zone, statistical data representing electric energy that is supplied to the feeding system facility 113 from the substation 114, surplus regenerative electric energy in the regenerative power generated in the electric train 102 that is collectable into the electricity storage device 103, the power storage amount and the discharge amount of the electricity storage device 103, and the like. In the embodiment, the data storage unit 126 stores therein the pieces of statistical data for each of conditions such as season, day of week, weather, temperature, and electric train running condition.

The prediction generation unit 121 generates, for each time zone, pieces of prediction data of the electric energy (received electric energy received from the substation 114 by the power receiving transformer 109) that is supplied to a supply destination (feeding system facility 113) from the substation 114 and the surplus regenerative electric energy in the regenerative power generated in a supply destination (feeding system facility 113) that is supplied to the electricity storage device 103. Although in the embodiment, the prediction generation unit 121 generates the pieces of prediction data of the electric energy for every 30 minutes as a unit of the time zone, the unit of the time zone is not limited to 30 minutes.

The prediction generation unit 121 in the embodiment generates the pieces of prediction data based on the statistical data having a high correlation with the conditions of the day including season, day of week, weather, temperature, and electric train running condition among the pieces of statistical data stored in the data storage unit 126. For example, priority information is added to the pieces of statistical data and the statistical data with the highest priority information for which correlation is found is used. Although the embodiment uses, as an example, all of season, day of week, weather, temperature, and electric train running condition as the conditions of the day, all of them are not limited to be used and it is sufficient that at least one of them is used.

Figure 3:
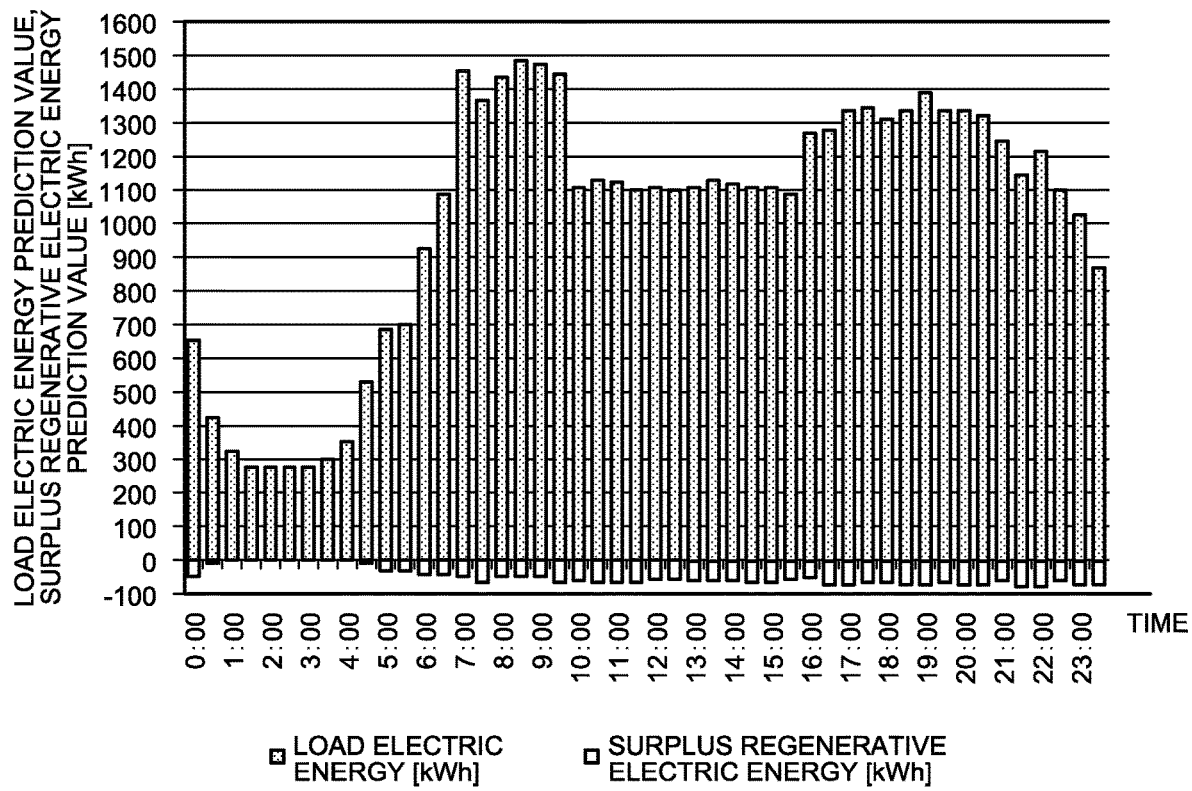
FIG. 3 is a diagram illustrating a part of pieces of prediction data generated by a prediction generation unit in the embodiment.

FIG. 3 is a diagram illustrating a part of the pieces of prediction data generated by the prediction generation unit 121 in the embodiment. FIG. 3 illustrates the electric energy that is supplied to the feeding system facility 113 from the substation 114 and the surplus regenerative electric energy generated in the feeding system facility 113 every 30 minutes.

FIG. 3 indicates, for example, the electric energy "527 [kWh]" that is supplied and the surplus regenerative electric energy "12 [kWh]" in 4:30 to 5:00, the electric energy "689 [kWh]" that is supplied and the surplus regenerative electric energy "31 [kWh]" in 5:00 to 5:30, and the like.

As illustrated in FIG. 3, the power consumption of the feeding system facility 113 reaches the peak in the time zone of 7:00 to 10:00. The control device 104 in the embodiment controls to cause the electricity storage device 103 to supply electric power in the above-mentioned peak time zone by preference. This control can therefore reduce the load on the substation 114 in the peak time zone.

Referring to FIG. 2 again, the plan generation unit 122 generates a charging/discharging plan for controlling a state of charge (SOC) of the electricity storage device 103 based on the pieces of prediction data generated by the prediction generation unit 121. The electricity storage device 103 is charged and discharged in accordance with the charging/discharging plan, thereby reducing the peak electric energy of the received electric energy from the substation 114.

The plan generation unit 122 in the embodiment generates the charging/discharging plan in which a target SOC lower than those in other time zones is set for a time zone having larger power consumption than those in the other time zones when the target SOCs are set for the respective time zone.

In the charging/discharging plan, for example, the target SOC is planned to be lowered and the electricity storage device 103 is caused to be discharged in the peak time zone, thereby reducing the received electric energy.

That is to say, when a residual amount of the electricity storage device 103 is higher than the target SOC, the amount of power reduction in the substation 114 is increased. When the residual amount of the electricity storage device 103 is lower than the target SOC, the amount of power reduction in the substation 114 is decreased. Adjustment of the target SOC therefore causes the difference between the target SOC and the residual amount of the electricity storage device 103 to be changed. The amount of power reduction amount in the substation 114 can thereby be adjusted.

In this case, the plan generation unit 122 creates the feasible charging/discharging plan in consideration of rated outputs and capacities of the electricity storage device 103 and the power conversion device 105. It has been generally known that when a nickel-hydrogen secondary battery or a lithium-ion secondary battery is used for the electricity storage device 103, charging/discharging thereof at a higher depth of discharge adversely influences the lifetime. For this reason, the plan generation unit 122 generates the charging/discharging plan such that the electricity storage device 103 is charged and discharged in a range without causing the lifetime thereof to be adversely influenced by preference in consideration of the type of the electricity storage device 103 used. Furthermore, when weights for the power rate and the power consumption reduction are different among the time zones, the plan generation unit 122 may generate the charging/discharging plan in consideration with the weights. In addition, various optimization methods may be applied to generation of the charging/discharging plan.

Figure 4:
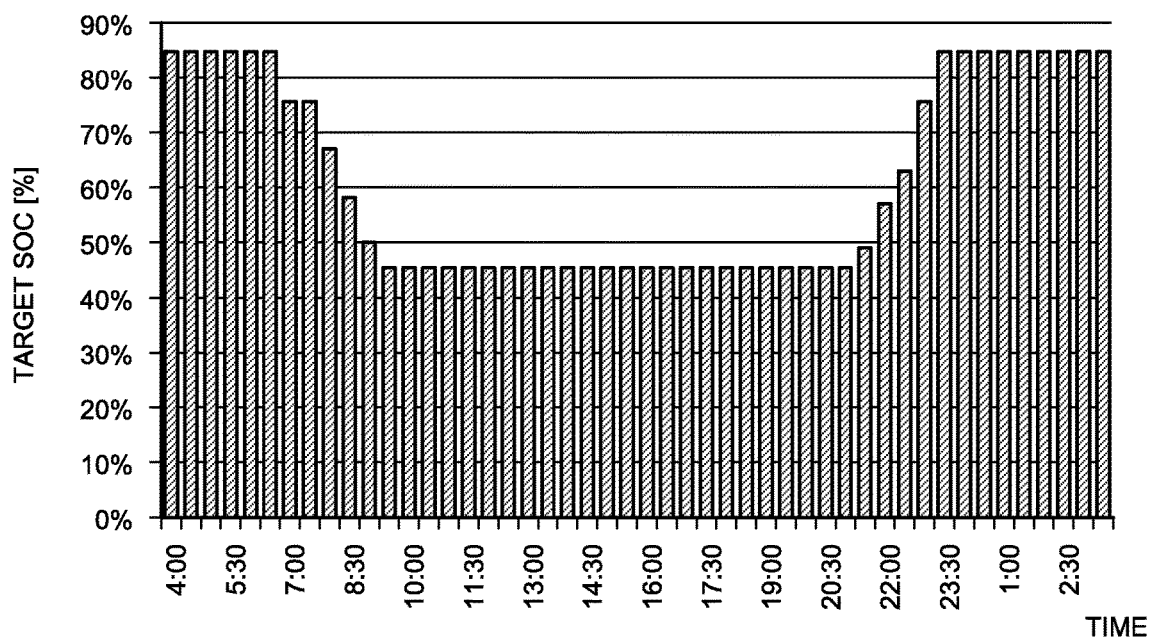
FIG. 4 is a diagram illustrating a charging/discharging plan generated by a plan generation unit in the embodiment.

FIG. 4 is a diagram illustrating the charging/discharging plan generated by the plan generation unit 122 in the embodiment. In an example illustrated in FIG. 4, the target SOC set for every 30 minutes is indicated as the charging/discharging plan.

In the example illustrated in FIG. 4, for example, the target SOC in 6:30 to 7:00 is set to 85%, the target SOC in 7:00 to 7:30 and 7:30 to 8:00 is set to 75.8%, the target SOC in 8:00 to 8:30 is set to 66.9%, and the target SOC in 8:30 to 9:00 is set to 58.3%.

That is to say, in 7:00 to 8:30, the electricity storage device 103 highly tends to perform discharging control in order to cause the actual residual amount to follow the target SOC because the target SOC of the electricity storage device 103 is lowered. The electricity storage device 103 therefore supplies electric power to the feeding system facility 113. This can reduce the electric energy that is supplied from the substation 114 in the peak time zone.

The target value setting unit 123 sets, for each time zone, the target SOC indicated as a reference of the electric energy to be stored in the electricity storage device 103 in the corresponding time zone in accordance with the charging/discharging plan generated by the plan generation unit 122. Setting of the target SOC in accordance with the charging/discharging plan can achieve setting of the target SOC for each time zone based on the pieces of prediction data generated by the prediction generation unit 121. It should be noted that although the charging target is expressed by the rate in the embodiment, it may be expressed by a numerical value (target charge value).

When the current time is, for example, 7:33, the target value setting unit 123 sets the target SOC (for example, 75.8%) in 7:30 to 8:00 in the charging/discharging plan as a reference value for adjusting the SOC of the electricity storage device 103.

The charging/discharging characteristic setting unit 124 sets charging and discharging start voltages of the power conversion device 105 based on the target SOC, the SOC detected from the electricity storage device 103, and a voltage detected from the feeder line 107 of the feeding system facility 113.

When the regenerative power is generated with speed reduction of the electric train 102, an electric current flows to another electric train from the electric train 102 and the voltage of the feeder line 107 therefore becomes higher than a standard feeding voltage. When the speed of the electric train 102 is increased, an electric current flows to the electric train 102 from the substation 114 and the voltage of the feeder line 107 is therefore lowered. In consideration of this, charging/discharging of the electricity storage device 103 is controlled based on the voltage of the feeder line 107 in the embodiment.

Figure 5:
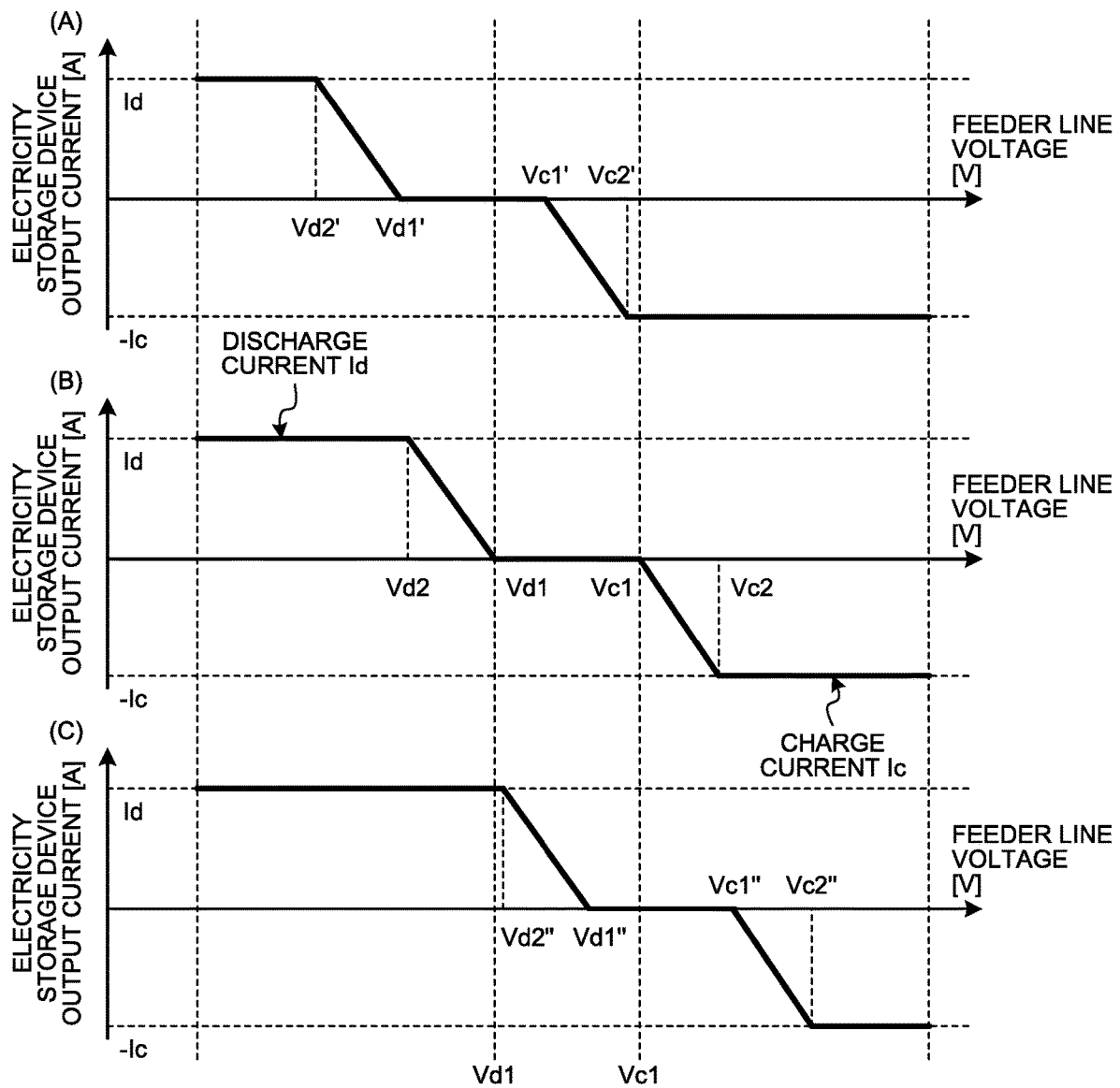
FIG. 5 is a diagram illustrating charging/discharging characteristic correspondence tables stored in a characteristic correspondence table storage unit in the embodiment.

The charging/discharging characteristic setting unit 124 in the embodiment sets the charging start voltage and the discharging start voltage of the power conversion device 105 based on the charging/discharging characteristics stored in a characteristic correspondence table storage unit 127. FIG. 5 is a diagram illustrating charging/discharging characteristic correspondence tables stored in the characteristic correspondence table storage unit 127 in the embodiment. In FIG. 5, the horizontal axis indicates the feeder line voltage and the vertical axis indicates an output current of the electricity storage device 103.

The charging/discharging characteristic correspondence tables illustrated in FIG. 5 are examples when the target SOC is set to "50%". FIG. 5(A) illustrates a table that is used when the SOC of the electricity storage device 103 is lower than the target SOC. FIG. 5(B) illustrates a table that is used when the SOC of the electricity storage device 103 is the same as or close to the target SOC. FIG. 5(C) illustrates a table that is used when the SOC of the electricity storage device 103 is higher than the target SOC.

When the SOC of the electricity storage device 103 is the same as or close to the target SOC, the charging/discharging characteristic setting unit 124 sets the charging and discharging start voltages illustrated in FIG. 5(B). In the example illustrated in FIG. 5(B), the charging/discharging characteristic setting unit 124 sets a discharging start voltage "Vd1" and a charging start voltage "Vc1". The charging start voltage "Vc1" is set to be generally higher than a standard feeding voltage V0 (not illustrated) so as not to interfere with interchange of the regenerative power between the electric trains. Furthermore, the discharging start voltage "Vd1" is set to be lower than the standard feeding voltage V0.

When the feeder line voltage is equal to or lower than the discharging start voltage "Vd1", the charging/discharging control unit 125 controls to cause the output current (discharge current) to be increased as the voltage of the feeder line 107 is lowered. When the feeder line voltage is lower than "Vd2", the charging/discharging control unit 125 controls to cause the electricity storage device 103 to be discharged with a current value "Id". To be specific, the charging/discharging control unit 125 generates a command value of the discharge current based on the charging/discharging characteristics and outputs it as the charging/discharging command value to the power conversion device 105.

When the feeder line voltage is equal to or higher than "Vc1", the charging/discharging control unit 125 controls to cause an input current (charge current) to be increased as the feeder line voltage is increased. When the feeder line voltage is higher than "Vc2", the charging/discharging control unit 125 controls to cause the electricity storage device 103 to be charged with a current value "Ic". To be specific, the charging/discharging control unit 125 generates a command value of the discharge current based on the charging/discharging characteristics and outputs it as the charging/discharging command value to the power conversion device 105.

When the SOC of the electricity storage device 103 is lower than the target SOC, the charging/discharging characteristic setting unit 124 sets the charging and discharging start voltages illustrated in FIG. 5(A). In the example illustrated in FIG. 5(A), the charging/discharging characteristic setting unit 124 sets a discharging start voltage "Vd1'" and a charging start voltage "Vc1'" (note that Vd1'<Vd1 and Vc1'<Vc1 are satisfied). Control by the charging/discharging control unit 125 is performed in the same manner as the control in the example of FIG. 5(B) other than difference in target values and description thereof is omitted.

When the discharging start voltage value is low (FIG. 5(A)), the electricity storage device 103 is discharged only when the voltage value of the feeder line 107 is lower than that in the case in which the discharging start voltage value is normal (FIG. 5(B)). The discharge amount from the electricity storage device 103 is therefore decreased. That is to say, in FIG. 5(A), the electricity storage device 103 is set such that it is easy to store electricity and is difficult to be discharged.

When the SOC of the electricity storage device 103 is higher than the target SOC, the charging/discharging characteristic setting unit 124 sets the charging and discharging start voltages illustrated in FIG. 5(C). In the example illustrated in FIG. 5(C), the charging/discharging characteristic setting unit 124 sets a discharging start voltage "Vd1''" and a charging start voltage "Vc1''" (note that Vd1''>Vd1 and Vc1''>Vc1 are satisfied). Control by the charging/discharging control unit 125 is performed in the same manner as the control in the example of FIG. 5(B) other than difference in the target values and description thereof is omitted.

When the discharging start voltage value is high (FIG. 5(C)), the electricity storage device 103 is charged only when the voltage value of the feeder line 107 is higher than that in the case in which the discharging start voltage value is normal (FIG. 5(B)). The charge amount to the electricity storage device 103 is therefore decreased. Thus, in FIG. 5(C), the electricity storage device 103 is set such that it is easy to be discharged and is difficult to store electricity.

In the embodiment, the charging/discharging characteristic correspondence tables illustrated in FIG. 5 are provided for each target SOC, as an example. That is to say, the charging/discharging characteristic setting unit 124 reads out the charging/discharging characteristic correspondence tables corresponding to the target SOC set by the target value setting unit 123 and performs the above-mentioned control. To be specific, as the target SOC is higher, the control reduces the charging start voltage "Vc1" and the discharging start voltage "Vd1". By contrast, as the target SOC is lower, the control increases the charging start voltage "Vc1" and the discharging start voltage "Vd1". In this manner, usage of the charging/discharging characteristic correspondence tables corresponding to the target SOC enables control of making the electricity storage rate of the electricity storage device 103 close to the target SOC to be performed.

The charging/discharging control unit 125 selects, for each time zone, a plurality of charging/discharging characteristic correspondence tables corresponding to the set target SOC, and then, specifies the charging/discharging characteristic correspondence table corresponding to the difference between the SOC detected from the electricity storage device 103 and the target SOC from the selected charging/discharging characteristic correspondence tables. Then, the charging/discharging control unit 125 controls charging/discharging of the electricity storage device 103 in accordance with a comparison result between the discharging start voltage value and the charging start voltage value defined in the specified charging/discharging characteristic correspondence table and the voltage of the feeder line 107.

The embodiment has explained an example in which the charging/discharging characteristic correspondence tables are held for each target SOC. The embodiment is however not limited to be applied to the case in which the charging/discharging characteristic correspondence tables are made to correspond to each target SOC. As a modification, the charging/discharging characteristic correspondence tables (for example, the charging/discharging characteristic correspondence tables at the target SOC of 50%) as a reference and offset values for adjusting the charging/discharging characteristic correspondence tables (for example, the charging/discharging characteristic correspondence tables at the target SOC of 50%) in order to provide the charging start voltage values and the discharging start voltage values corresponding to the target SOCs may be held.

In this modification, the charging/discharging characteristic setting unit 124 adjusts the charging/discharging characteristic correspondence tables with the offset value corresponding to the received target SOC to thereby generate the charging/discharging characteristic correspondence tables corresponding to the received target SOC. Processing using the generated charging/discharging characteristic correspondence tables is the same as the above-mentioned processing and description is therefore omitted.

As still another method, the charging/discharging characteristic setting unit 124 may generate the charging/discharging characteristics corresponding to the received target SOC without holding the charging/discharging characteristic correspondence tables. Various methods may be employed as the method for generating the charging/discharging characteristics.

The charging/discharging control unit 125 performs control of at least charging or discharging of the electricity storage device 103 using the power conversion device 105 based on the target SOC for each time zone that has been set by the target value setting unit 123, the SOC detected from the electricity storage device 103, and the voltage of the feeder line 107 as the supply destination of electric power from the electricity storage device 103. To be specific, the charging/discharging control unit 125 in the embodiment calculates charging and discharging command values of the electricity storage device 103 based on the charging start voltage value and the discharging start voltage value defined in the charging/discharging characteristic correspondence table corresponding to the target SOC for each time zone that has been set by the target value setting unit 123, and the voltage value detected in the feeder line 107, and the charging/discharging control unit 125 controls the power conversion device 105.

Figure 6:
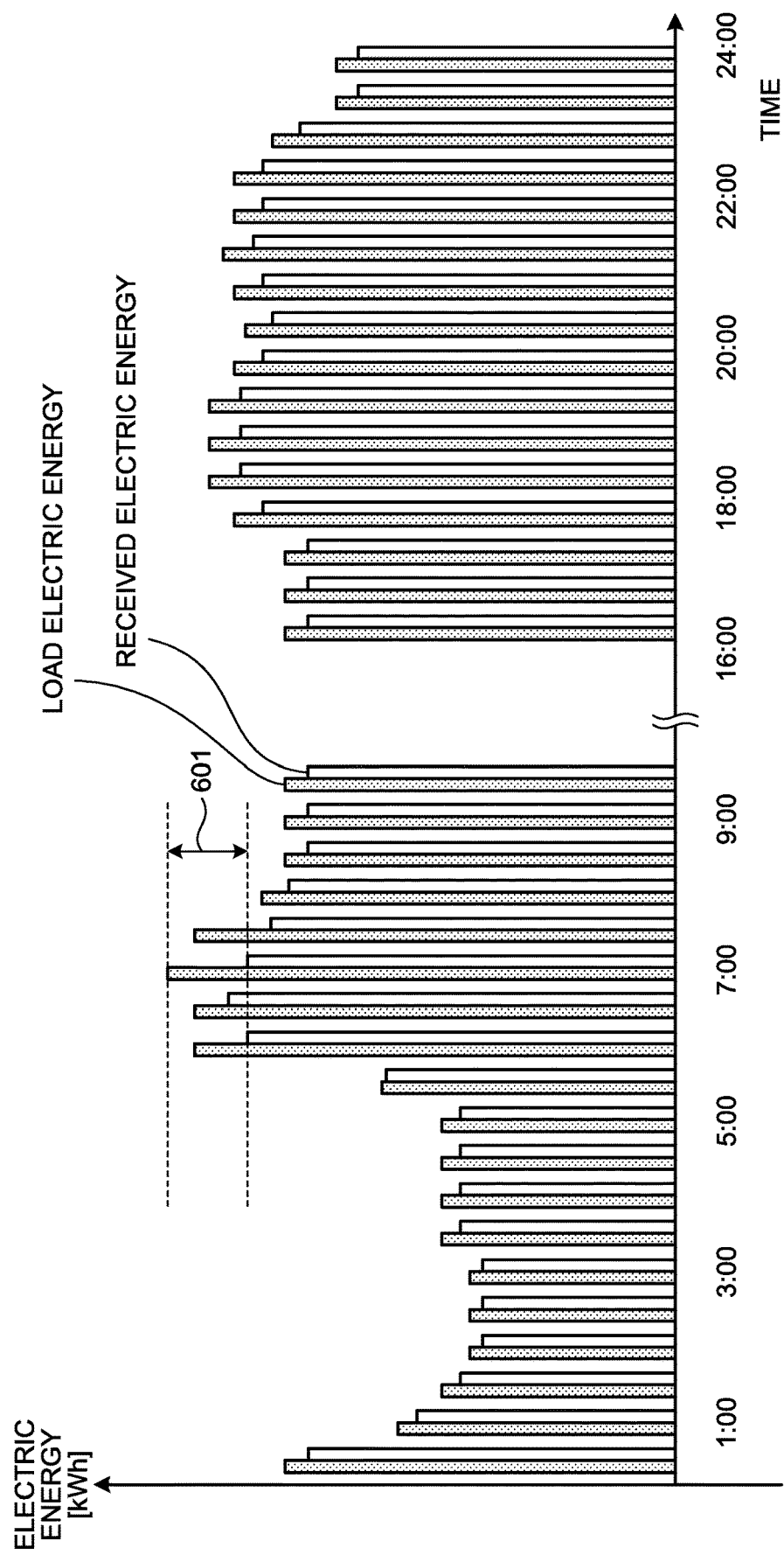
FIG. 6 is a diagram illustrating transitions of load electric energy and received electric energy by a feeding system facility in the embodiment.

Next, effects when the control device 104 performs control will be described. FIG. 6 is a diagram illustrating transitions of the load electric energy and the received electric energy of the feeding system facility 113. With the transitions illustrated in FIG. 6, it can be seen that the received electric energy is reduced by an electric energy width 601 in comparison with the load electric energy around a time zone (for example, 7:00) in which the load electric energy reaches the peak.

The load electric energy in the railway business is a value obtained by summing electric energy that is purchased commercial power used for operating electric trains and consumed in stations.

That is to say, in the embodiment, the surplus regenerative power generated in the electric train 102 is stored in the electricity storage device 103 and control of lowering the target SOC of the electricity storage device 103 is performed in the peak time zone to increase the electric energy discharged to the feeding system facility 113 from the electricity storage device 103. This can decrease the received electric energy from the substation 114. Thus, the embodiment can prevent regeneration invalidation and achieves energy saving.

Conventionally, the electricity storage device is charged and discharged so as to keep the SOC of the electricity storage device constant. This enables the electricity storage device to be utilized reliably because it can be charged and discharged all the time by setting the SOC of the electricity storage device to be in an intermediate state. In addition, facility usage efficiency is improved. Furthermore, when the secondary battery is used for the electricity storage device, in particular, adverse influence on the battery lifetime due to over-discharging can be prevented. If the above-mentioned control is performed regardless of the peak time zone, however, there is a possibility that received electric energy from the substation is increased in the peak time zone even though the electric power is stored in the electricity storage device.

By contrast, in the embodiment, the peak electric energy of the received electric energy can be decreased by changing the target SOC of the electricity storage device 103 in a range of giving no or less influence onto the lifetime thereof.

Figure 7:
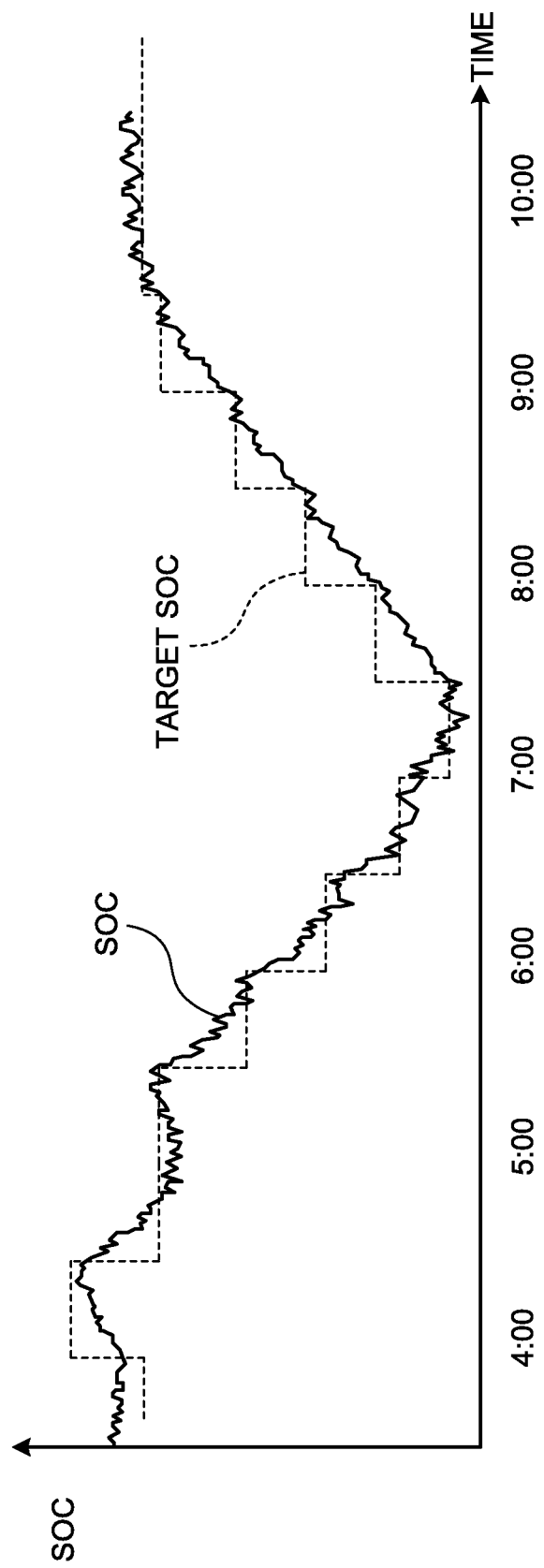
FIG. 7 is a diagram illustrating transitions of a state of charge (SOC) of an electricity storage device and a target SOC in the embodiment.

FIG. 7 is a diagram illustrating transitions of the SOC of the electricity storage device 103 and the target SOC. As illustrated in FIG. 7, the target SOC is set to be lower toward 7:00 at which the load electric energy reaches the peak. The charge amount of the electricity storage device 103 is gradually decreased so as to follow the set target SOC. The decrease in the charge amount and discharging from the electricity storage device 103 can reduce the received electric energy in the peak time zone.

The control device 104 sets to increase the target SOC in the time zone with low load electric energy, thereby storing electric power in the electricity storage device 103 in the time zone.

Figure 8:
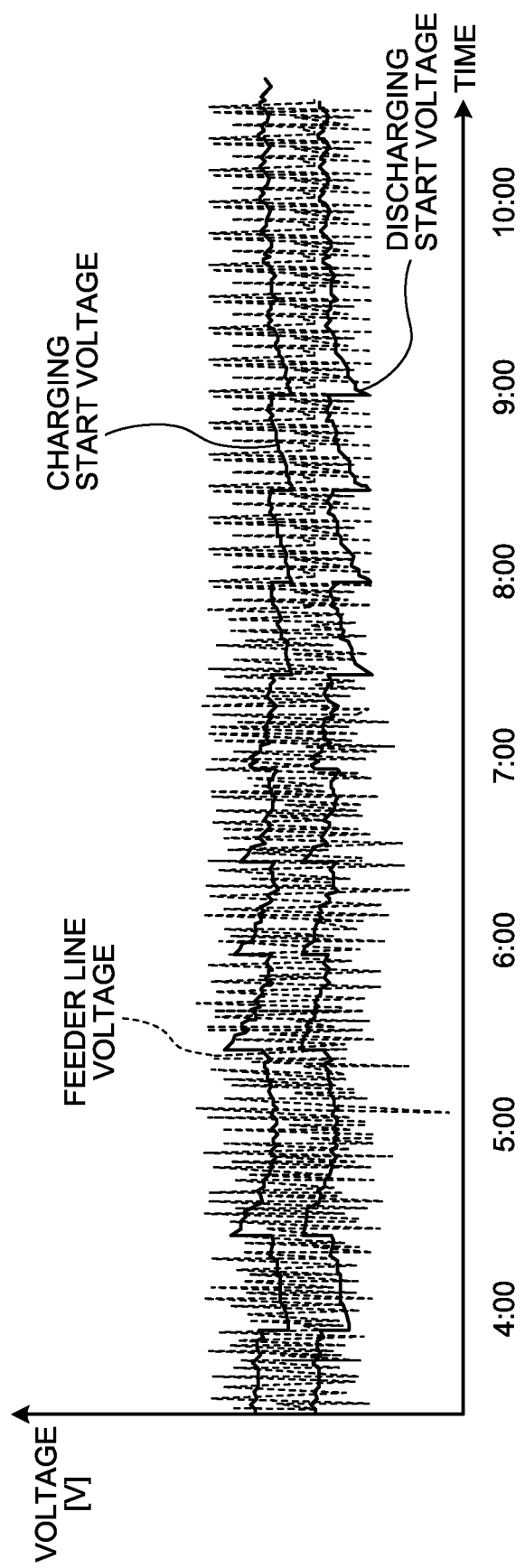
FIG. 8 is a diagram illustrating transitions of a voltage of a feeder line, a charging start voltage, and a discharging start voltage in the embodiment.

FIG. 8 is a diagram illustrating transitions of the voltage of the feeder line 107, the charging start voltage, and the discharging start voltage. In an example illustrated in FIG. 8, the charging start voltage and the discharging start voltage are derived from the charging/discharging characteristic correspondence table defined based on the SOC of the electricity storage device 103 and the target SOC. When the voltage of the feeder line 107 is higher than the charging start voltage, the electricity storage device 103 is charged, and when the voltage of the feeder line 107 is lower than the discharging start voltage, the electricity storage device 103 is discharged. The voltage of the feeder line 107 varies with running of electric trains and the like and therefore becomes higher than the charging start voltage and becomes lower than the discharging start voltage frequently. With the variation, the electricity storage device 103 is repeatedly charged and discharged. When the charge amount in a predetermined period of time is larger than the discharge amount, the charge amount of the electricity storage device 103 is increased, and when the charge amount in the predetermined period of time is smaller than the discharge amount, the charge amount of the electricity storage device 103 is decreased.

In the example illustrated in FIG. 8, it can be seen that the charging start voltage and the discharging start voltage acutely transition at the time points at which the target SOC is switched. Thereafter, the SOC of the electricity storage device 103 makes close to the target SOC, therefore, it can be seen that the charging start voltage and the discharging start voltage make closer to the standard charging start voltage and the standard discharging start voltage, respectively (in other words, those when the target SOC and the SOC of the electricity storage device 103 are the same or closer to each other). As described above, adjustment of the charging start voltage and the discharging start voltage with the electric energy that is discharged and the regenerative electric energy can reduce the peak electric energy of the received electric energy.

Figure 9:
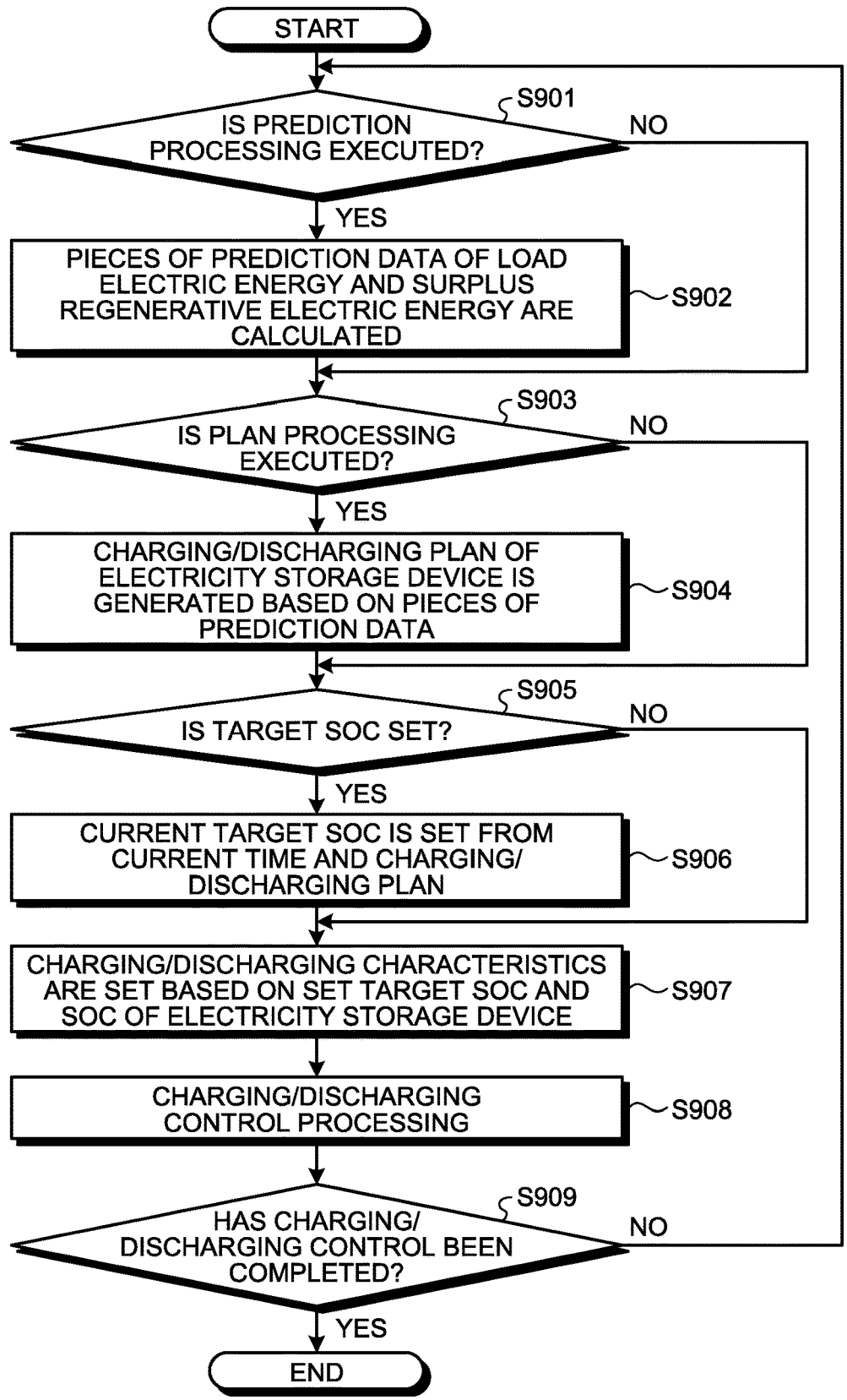
FIG. 9 is a flowchart illustrating procedures of charging/discharging control in a control device of the electricity storage system in the embodiment.

Next, charging/discharging control by the control device 104 of the electricity storage system 101 in the embodiment will be described. FIG. 9 is a flowchart illustrating procedures of the above-mentioned processing in the control device 104 of the electricity storage system 101 in the embodiment.

First, the prediction generation unit 121 determines whether to execute prediction processing (step S901). When, for example, the condition such as the weather changes, the running plan is changed, and so on after the previous prediction processing is executed, the prediction generation unit 121 determines to execute the prediction processing. A determination criterion is not limited and the prediction generation unit 121 may determine to execute the prediction processing after a predetermined period of time has passed from the previous prediction processing. For example, the predetermined period of time may be an interval of 5 minutes but it is sufficient that an appropriate period of time is set in accordance with an implementation mode. When the condition necessary for prediction is not changed (for example, an electric train timetable is not changed) and so on, the prediction is not necessarily executed. When the prediction generation unit 121 determines not to execute the prediction processing (No at step S901), the process proceeds to step S903.

When the prediction generation unit 121 determines to execute the prediction processing (Yes at step S901), it calculates pieces of prediction data of the load electric energy and the surplus regenerative electric energy of the feeding system facility 113 based on the statistical data stored in the data storage unit 126 (step S902).

Thereafter, the plan generation unit 122 determines whether to execute plan processing (step S903). For example, the plan generation unit 122 determines whether to execute the plan processing based on whether new prediction data has been calculated after the previous charging/discharging plan has been generated. As another criterion, the plan generation unit 122 may determine whether to execute the plan processing based on whether the difference between the SOC detected from the electricity storage device 103 and the target SOC is in a range requiring no replanning of the charging/discharging plan. When the plan generation unit 122 determines not to execute the plan processing (No at step S903), the process proceeds to step S905.

When the plan generation unit 122 determines to execute the plan processing (Yes at step S903), it generates the charging/discharging plan of the electricity storage device 103 based on the pieces of prediction data (step S904).

Then, the target value setting unit 123 determines whether to set the target SOC (step S905). For example, the target SOC is set when a predetermined period of time has passed from the previous setting and the charging/discharging plan has been regenerated. The target SOC is also reset, for example, at the change timing of the target SOC. When the target value setting unit 123 determines that it does not set the target SOC (No at step S905), the process proceeds to step S907.

When the target value setting unit 123 determines to set the target SOC (Yes at step S905), it sets the current target SOC based on the current time and the charging/discharging plan (step S906).

Thereafter, the charging/discharging characteristic setting unit 124 sets the charging/discharging characteristics (the charging start voltage value and the discharging start voltage value) based on the set target SOC and the current SOC of the electricity storage device 103 (step S907).

Then, the charging/discharging control unit 125 performs charging/discharging control of the electricity storage device 103 through the power conversion device 105 in accordance with the set charging/discharging characteristics (step S908).

After that, the charging/discharging control unit 125 determines whether the charging/discharging control has been completed (step S909). When the charging/discharging control unit 125 determines that the charging/discharging control has not been completed (No at step S909), processing is performed from step S901 again.

First Modification

Furthermore, the embodiment does not limit the prediction data generation method to generation based on the statistical data stored in the data storage unit 126. As the modification, the control unit includes, as an example, a feeding simulation unit that simulates the electric train running plan based on an electric train timetable, a railway route condition, a vehicle condition, a feeding circuit condition, and the like.

Figure 10:
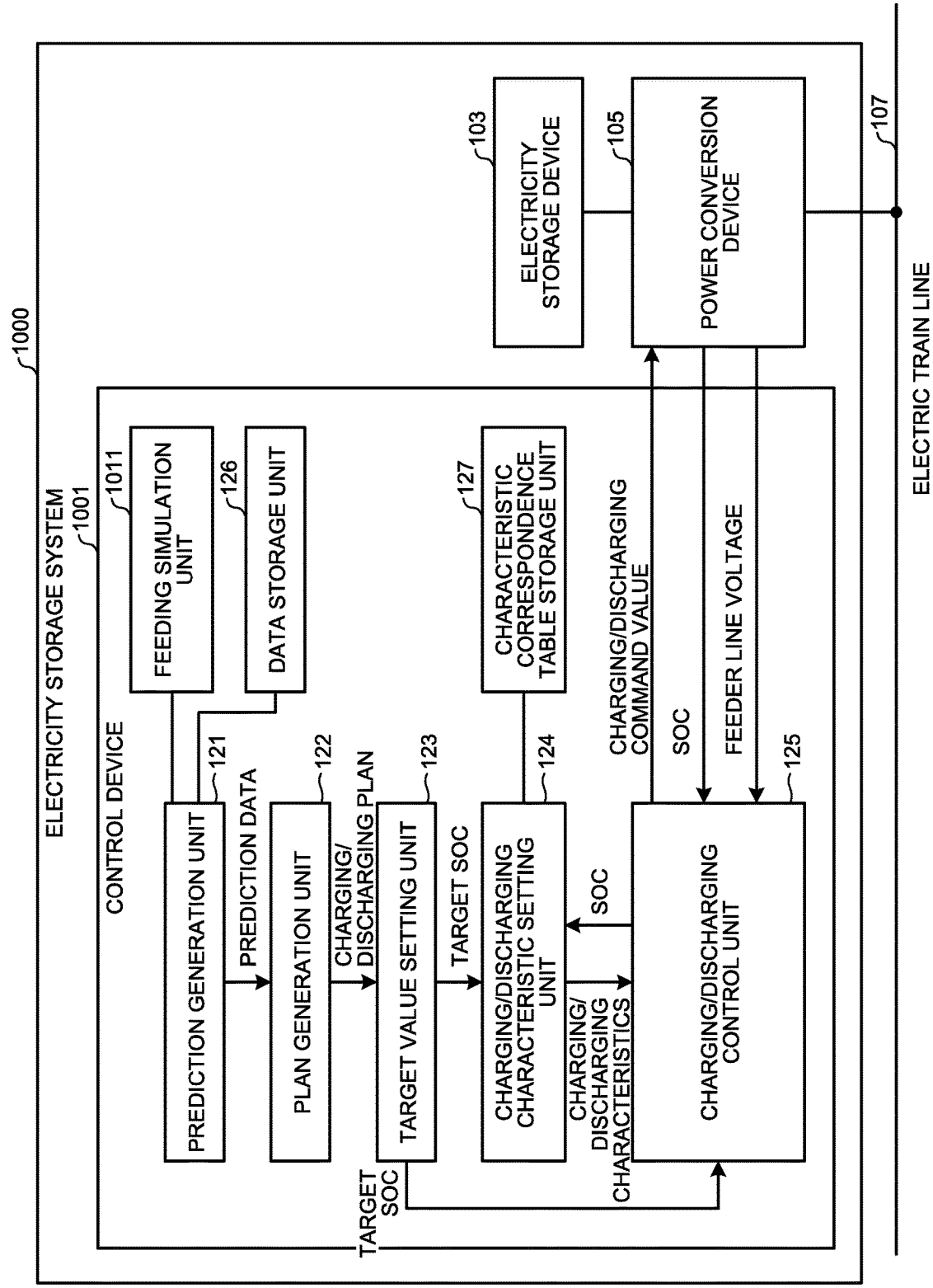
FIG. 10 is a diagram illustrating the configuration of an electricity storage system and data flow according to a modification.

FIG. 10 is a diagram illustrating the configuration of an electricity storage system 1000 and data flow according to the modification. A control device 1001 in the modification is an example in which a feeding simulation unit 1011 is added to the control device 104 in the embodiment.

The feeding simulation unit 1011 acquires a current running schedule of the electric train 102 in powering operation in the feeding system facility 113, and simulates regenerative power energy, load power energy, and the like when the electric train 102 performs powering operation in accordance with the running plan.

Then, the prediction generation unit 121 generates pieces of prediction data for each time zone based on a result of the simulation by the feeding simulation unit 1011.

That is to say, when the electric train 102 runs as scheduled, it is sufficient that the statistical data stored in the data storage unit 126 is used but the running schedule is rearranged in some conditions because of the weather, an accident, or the like. The statistical data matching with such conditions is not necessarily stored in the data storage unit 126. The feeding simulation unit 1011 performs the simulation in accordance with the current running schedule to enable the prediction generation unit 121 to generate the pieces of prediction data appropriate for the current condition. Subsequent pieces of processing are the same as those in the embodiment and description thereof is omitted.

Thus, for example, the prediction generation unit 121 may make prediction based on the past statistical data stored in the data storage unit 126 when the electric train timetable is not disturbed, and the prediction generation unit 121 may make prediction by selecting an appropriate way from a plurality of prediction ways, for example, prediction by the feeding simulation unit 1011, when the electric train timetable is disturbed.

Second Modification

As still another method, the prediction generation unit 121 may generate pieces of prediction data based on the number of electric trains per hour set in the electric train timetable of the prediction day, specific energy consumption (energy consumption per unit distance and unit weight or per vehicle) of the electric train, average regeneration invalidation for each time zone, and the like.

Although the supply destination of electric power stored in the electricity storage device 103 is the feeding system facility 113 in the above-mentioned embodiment and the first modification, the supply destination is not limited thereto and, for example, may be the station facility 112 or another facility.

Although the SOC is set as the target value, as an example, in the above-mentioned embodiment, the target value is not limited to the SOC and may be a charging voltage or the like.

In the above-mentioned embodiment and modifications, the charging/discharging control appropriate for each time zone can be performed by controlling the electricity storage device such that the SOC follows the target value set for each time zone. This can reduce the power energy load in the peak time zone.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

The invention claimed is:

1. An electricity storage control device comprising:
a setting unit that sets, for each time zone, a target state of charge (SOC) of electric energy to be stored in an electricity storage device in the time zone;
a control unit that controls at least charging or discharging of the electricity storage device based on the set target SOC for each time zone, a SOC detected from the electricity storage device, and a voltage of a supply destination of electric power from the electricity storage device;
wherein the control unit generates pieces of prediction data, for each time zone, of electric energy that is supplied to the supply destination from a substation and surplus regenerative electric energy in regenerative power generated in the supply destination that is supplied to the electricity storage device,
wherein the setting unit sets the target SOC for each time zone based on the pieces of prediction data generated by the control unit.

2. The electricity storage control device according to claim 1, wherein the control unit controls at least charging or discharging of the electricity storage device in accordance with a comparison result between the voltage of the supply destination and a reference voltage for starting discharging or charging that has been set in accordance with a difference between the target SOC for each time zone and the SOC detected from the electricity storage device.

3. The electricity storage control device according to claim 1, wherein the setting unit sets, for a time zone having a larger power consumption amount than power consumption amounts in other time zones, a target SOC lower than target SOCs in the other time zones when setting the target SOC for each time zone.

4. The electricity storage control device according to claim 1, further comprising a data storage unit that stores therein, for each condition of a day, statistical data in which the electric energy that is supplied to the supply destination from the substation and the surplus regenerative electric energy in the regenerative power generated in the supply destination capable of being collected into the electricity storage device are recorded for each time zone,
   wherein the control unit generates the pieces of prediction data based on the statistical data having a large correlation with the condition of the day in the pieces of statistical data stored in the data storage unit.

5. The electricity storage control device according to claim 4, wherein the control unit uses at least one of conditions of season, day of week, weather, temperature, and electric train running condition as the condition of the day.

6. The electricity storage control device according to claim 1, further comprising a simulation unit that simulates load electric energy to the supply destination from the substation and the regenerative electric energy generated in the supply destination in accordance with a schedule of the supply destination,
   wherein the control unit generates the pieces of prediction data for each time zone based on a result of the simulation by the simulation unit.

* * * * *